J. G. DETTINGER, Jr. & F. H. WELKER.
ARTIFICIAL TOOTH.
APPLICATION FILED JUNE 18, 1914.
1,130,892.
Patented Mar. 9, 1915.
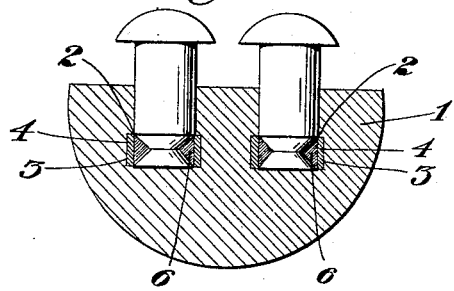
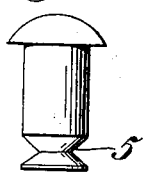
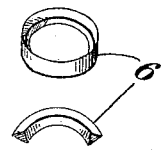
Attest:
E. M. Hamilton
B. L. Bishop
Inventors:
John G. Dettinger, Jr., and
Frank H. Welker.
By Spear, Middleton, Donaldson & Spear
Attys.

UNITED STATES PATENT OFFICE.

JOHN G. DETTINGER, JR., AND FRANK H. WELKER, OF PHILADELPHIA, PENNSYLVANIA.

ARTIFICIAL TOOTH.

1,130,892. Specification of Letters Patent. Patented Mar. 9, 1915.

Application filed June 18, 1914. Serial No. 845,911.

*To all whom it may concern:*

Be it known that we, JOHN G. DETTINGER, Jr., and FRANK H. WELKER, citizens of the United States, residing at Philadelphia, Pennsylvania, have invented certain new and useful Improvements in Artificial Teeth, of which the following is a specification.

This invention relates to artificial teeth, and more particularly to means for securing the holding pins in position in the tooth.

The object of the invention is to provide a simple and firm means for holding the pins in the teeth so as to prevent the pin from being pulled out of the tooth.

The invention is illustrated in the accompanying drawings, in which—

Figure 1 is a sectional view through a tooth showing a pin held therein; Fig. 2 is a view of a pin; Fig. 3 is a view showing the ring of solder.

As shown in this drawing, the tooth 1 is provided with a recess 2 to receive the pin, the recess having an enlarged portion 3 at its bottom to receive the known platinum coil 4. The pin is provided with a groove 5 of any desired shape, said groove being so located as to aline with the coil 4 when the parts are assembled. In the groove 5 is placed a ring of solder 6 which, as shown, fills the groove so that the pin completely fills the recess formed in the tooth. Of course a number of grooves may be formed in the pin if a firmer anchorage is desired.

The invention may be carried out as follows: The tooth is formed in a mold provided with as many recess forming pins as there are recesses to be formed in the tooth. The platinum coil 4 is then inserted in the walls of the recess and the tooth is burned. The pin 2 with its ring of solder in the groove thereof is inserted in the recess with the ring of solder in alinement with the platinum coil and the tooth is then heated to cause the solder to adhere to the coil and thus securely connect the coil and pin through the medium of the solder.

We claim as our invention:—

A tooth having a recess therein, a platinum coil in said recess, a pin having a groove therein, and a ring of solder in said groove adapted to be melted to unite with the coil.

In testimony whereof, we affix our signatures in presence of two witnesses.

JOHN G. DETTINGER, JR.
FRANK H. WELKER.

Witnesses:
FRED. FRANKS,
JAMES I. JELLETT.

Copies of this patent may be obtained for five cents each, by addressing the "Commissioner of Patents, Washington, D. C."